United States Patent [19]
Iannello

[11] Patent Number: 5,908,075
[45] Date of Patent: Jun. 1, 1999

[54] THATCHER

[76] Inventor: Carl J. Iannello, 846 Del Moy Ave., Bellevue, Ohio 44811

[21] Appl. No.: 08/832,110

[22] Filed: Apr. 3, 1997

[51] Int. Cl.[6] .................................................. A01D 76/00
[52] U.S. Cl. ............................................. 172/42; 172/27
[58] Field of Search ............................... 111/52; 172/26, 172/27, 42, 43, 120, 125, 112; 56/172, 175, 396, 400

[56] References Cited

U.S. PATENT DOCUMENTS

| | | | |
|---|---|---|---|
| 1,314,307 | 8/1919 | Davidson | 172/42 X |
| 2,028,957 | 1/1936 | Swan | 172/42 |
| 2,401,577 | 6/1946 | Melling, Sr. | 172/42 X |
| 3,504,748 | 4/1970 | Croft | 172/42 |
| 3,545,187 | 12/1970 | Whitney | 56/27 |
| 3,807,506 | 4/1974 | Penky | 172/42 |
| 4,151,701 | 5/1979 | Marto | 56/16.1 |
| 4,317,327 | 3/1982 | Doering | 56/396 |
| 4,322,936 | 4/1982 | Whitney | 56/16.1 |
| 4,591,001 | 5/1986 | Barbee | 172/112 X |
| 4,689,941 | 9/1987 | Doering | 56/396 |
| 4,910,948 | 3/1990 | Nelson | 56/16.1 |

*Primary Examiner*—Thomas B. Will
*Assistant Examiner*—Robert Pezzuto
*Attorney, Agent, or Firm*—Patent & Trademark Services; Thomas Zack; Joseph H. McGlynn

[57] ABSTRACT

A thatch removing attachment for a conventional rototiller. A first mounting bracket is fixed to the rear center of the tiller and has threaded upper surface holes. A second top mounted bracket with several depending spaced spring tooth rake fingers is mounted to the first bracket. Bolt fasteners permit the two brackets to be easily attached or detached from each other. As the rototiller moves the rake fingers thatch the ground underneath as an operator walks behind while the rototiller blades are elevated.

1 Claim, 2 Drawing Sheets

THATCHER

BACKGROUND OF THE INVENTION

Maintaining a decent grass lawn requires a good amount of expense and effort. One of the less desirable chores that needs to be done is that of thatching to remove dead grass. For many this means pulling a "thatching rake" by hand over the lawn to remove the dead grass. This is a time consuming activity which requires the expenditure of physical effort to move the rake and remove its dead grass depending on the lawn's size, the grass height, the type of grass, etc. Since, thatching is only performed once or at most a few times a year, it is not practical for my users to purchase a powered garden tool which is designed to only perform a thatching operation. This lead to attempts to reduce thatching time and effort need by modifying conventional powered or lawn garden tool with some type of retrofit thatch remove outfit to perform the work. One example, is the substituting of a thatching blade for the normal cutting blade on a convenient push or powered walk behind lawn mower. The present invention relates to another possible modification of a convenient lawn or garden power tool, a rototiller, wherein provision is made to permit the easy attachment and removal of a thatch removing mechanism as described herein.

DESCRIPTION OF THE PRIOR ART

Garden or lawn machines that work on the ground are known. For example, in U.S. Pat. No. 3,545,187 to Whitney a power lawn rake is disclosed having spring projecting tines mounted around the circumference of a rotatable reel. Another example is found in U.S. Pat. No. 4,151,701 to Marto wherein a riding lawn mower turf thatcher has a mobile V-shaped frame with a shaft on which depending springs are mounted that extend to the turf. The U.S. Pat. No. 4,322,936 to Whitney discloses racking spring tines mounted to the front of a riding mower. And in U.S. Pat. No. 4,910,948 to Nelson a rotary drum having blades mounted in a circumferentially staggered array that can be vertically adjusted is disclosed. The present invention relates to an attachment for a rototiller having a spring tooth rake assembly with a top mounted bracket as more further set forth in this specification.

SUMMARY OF THE INVENTION

This invention relates to a thatch removing attachment for a rototiller having a top mounted bracket with a depending spring tooth rake assembly. Fasteners permit the bracket to attached to the back of a conventional rototiller while its rake assembly engages and thatches the earth with the operator walking behind.

It is the primary object of the present invention to provide for an improved thatching apparatus that is attachable to a rototiller.

Another object is to provide for such an apparatus that can easily be removed or attached, as desired, while providing an effective thatch remover when operative.

These and other objects and advantages of the present invention will become apparent to readers from a consideration of the ensuing description and the accompanying drawings.

DESCRIPTION OF THE PREFERRED EMBODIMENT

Figure 1:
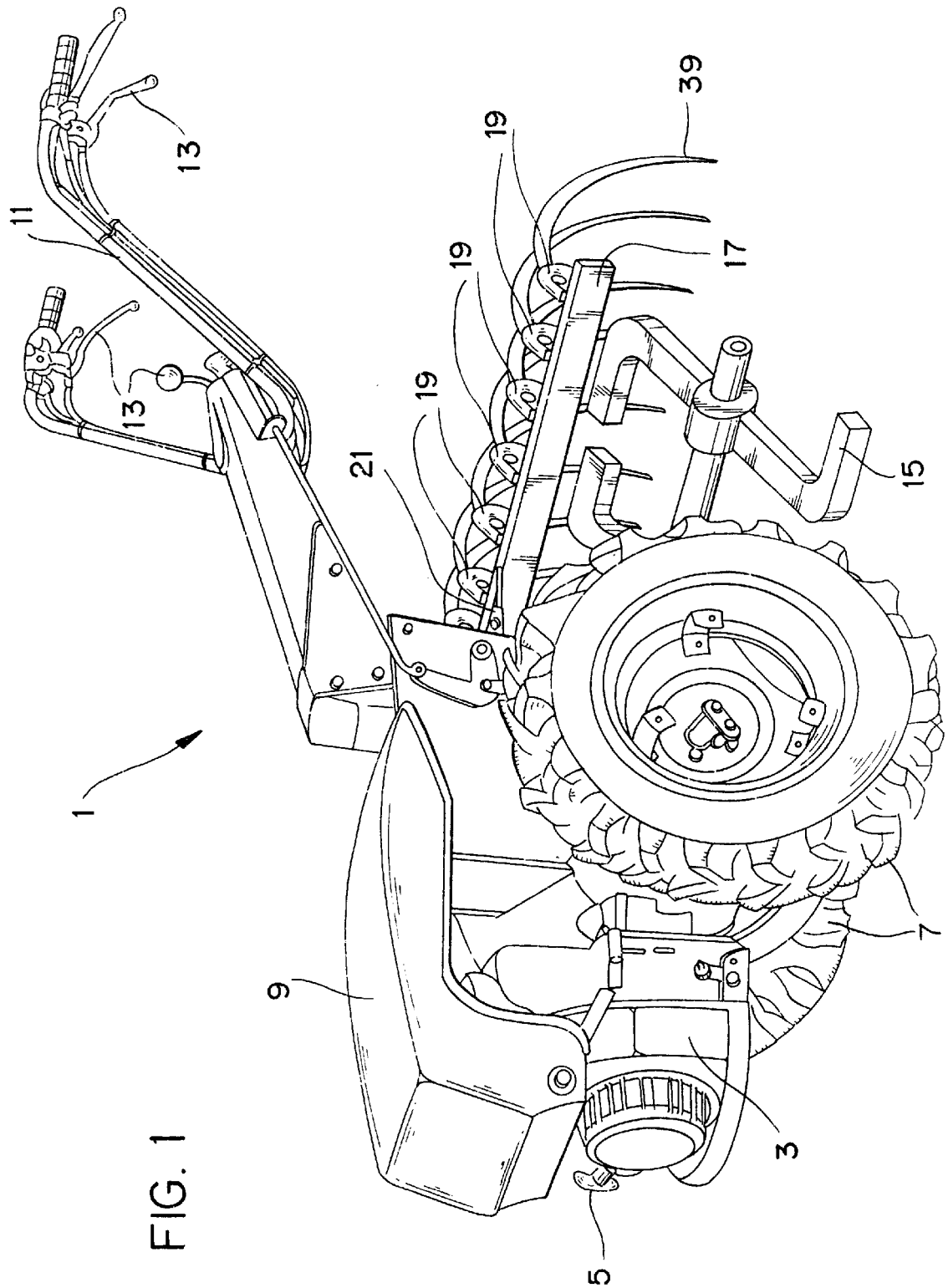
FIG. 1 is a side perspective view of the invention's preferred embodiment showing it attached to a conventional rototiller.

FIG. 1 is a side perspective view of the invention's preferred embodiment showing it attached to a conventional gas powered rototiller 1. A small gasoline powered engine 3 with a pull rope starter 5 supplies power to move the machine forward or backwards and to rotate its ground tiller blades located on the underside that breaks up the earth below. Large side tires 7, whose rotated, are powered by the engine 3 to insure sure footing for a walk behind operator. A front housing hood 9 may be used to protect the engine while a rear handle bar 11 with its connected controls 13 allows the operator to turn, stop and adjust the movement of the tiller and its rotating lower ground engaging tiller blades. All of these tiller components, including the rear tiller component 15, are found on a conventional typical rototiller.

Retrofitted to the tiller 1 is a horizontally disposed laterally extending elevated rectangular bracket 17 having several (seven shown) spaced identical curved spring tooth ground engaging rake finger members 19 mounted on it. This metal bracket resembles a 2 by 4 wooden board several feet long in shape and each rake finger has a tapered exposed lower end. Just barely visible in this figure is a center mounted upper bracket 21 fixed on the tiller's rear side. This center bracket is used to mount bracket 17 and its depending rake finger members 19 to the back of the tiller.

Figure 2:
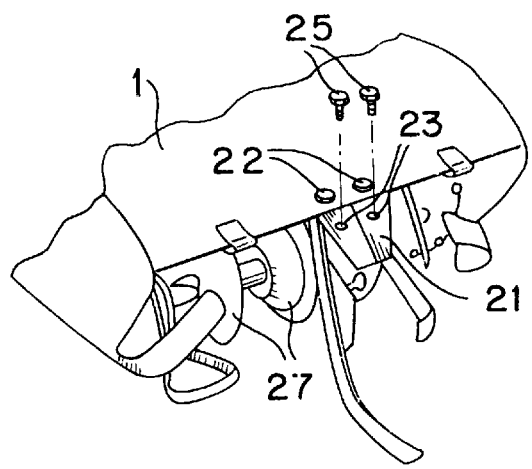
FIG. 2 shows part of the back of a conventional rototiller and with the part mounting bracket used in FIG. 1.

FIG. 2 shows part of the back of a conventional rototiller with the added center mounting bracket 21, partially shown in FIG. 1, on which the lateral extending bracket 17 is attached by two vertical bolts. Bracket 21 is attached to the back center of the tiller's chassis by two in-place bolts 22 and has a flat upper surface and extends rearwardly like a protruding tongue away from the rear of the tiller 1. Opened surface holes 23 with internal threads in the flat surfaced bracket 21 match up with similar spaced holes on two extension arms on the horizontal bracket 17 to permit the insertion from above of the two connecting bolts 25 to fasten these two brackets together. The remainder of the components shown in FIG. 2 are conventional parts of the rototiller's rear portion including the ground engaging lower rotating tiller blades 27 fixed to a rotating shaft which break up the ground. When the thatcher is employed to thatch the ground the tiller blades are inoperative and elevated.

Figure 3:
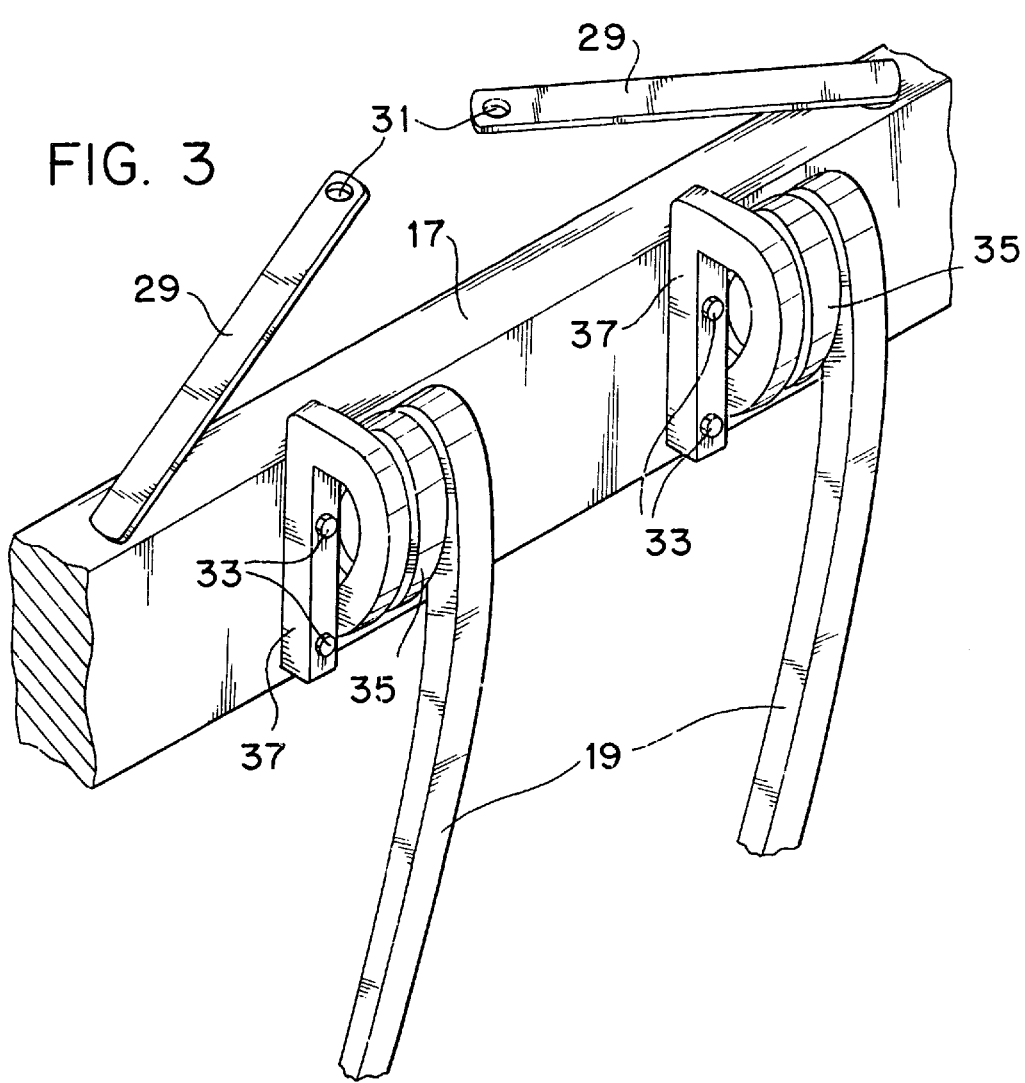
FIG. 3 shows a rear perspective view of part of the mounting bracket and the upper part of two of its spring rake members.

FIG. 3 shows a rear perspective view of part of the horizontal rear mounting bracket 17 with its two attached arm extensions 29 and upper joined parts of two of its spring rake finger members 19. A Weldment mounting bracket is used for the arm extensions to mount members 19 to the top surface of the elongated horizontal and laterally extending bracket 17. Holes 31 located near the arm 29 ends permit the insertion of the headed bolts 25 there through to engage the threads in mount holes 23 in bracket 21 and fasten the two brackets 17 and 21 together. The center extending bracket 21 fits into the space formed between the two extending arms 29 while its lower surface sits on the top surface of bracket 17.

Shown depending from the back of laterally and horizontally disposed bracket 17 are the upper parts of two of the several spaced spring tooth rake finger members 19. A pair of vertical mounting bolts 33 are used to hold the vertical disposed end of each of the rake members 19 to the bracket 17. Each rake member has an upper coiled section 35 near its end portion immediately before the vertical section 37 which fits against the flat rear vertical flat surface side of rectangular bracket 17 and contains the two spaced holding bolts 33. The rake members 19 are made of a unitary metal material extending from their lower ground engaging pointed fingers 39 (see FIG. 1) to their upper end located just past the lower bolt 33 on vertical section member 37. They thus provide a spring rake that will bounce slightly upward should their ends 39 encounter a hard rock or other object in the earth being thatched.

The spring tooth thatch fingers 19, as well as their tow mounting brackets would best be manufactured using standard metal stamping and punching techniques. Metal stamping is a process whereby flat metal is formed between two parts of a die under tremendous pressure. The metal can be punched, formed and shaped in these dies, many times in one process, and spot welding of separate components can be employed to complete the assembly of sheet metal components. The stamped metal, as here, may be stainless steel or plated carbon steel to prevent rusting. The metal punching process involves a male and female die, both are which are machined into the shape of the desired finished product. The dies are made of hardened tool steel, and are placed in the jaws of a hydraulic press. In operation, the steel material to be punched is placed between the two die components and the hydraulic press activated. The two dies quickly "punch out" the desired shape from the sheet metal, producing the desired metal component. Holes for the bolts or other fasteners may be drilled and tapped, or punched into the brackets' surfaces . The Thomas Register of American Manufacturers is a good source for locating commercial suppliers of the types of materials that can be used for these components.

Mounting holes would also have to be provided for the bolts 33 used to mount the spring rake ends to the bracket 17. These holes could be stamped at the same time the outline of the rake fingers are formed. Once punched into the metal, the now straight section of the thatcher rake finger is heated and formed on a coil forming jig or machine to the desired shape. Hydraulic forming equipment would stamp the lower ends 39 of the finger sections to a tapered end.

The thatching fingers 19 would last longer and would operate best if they were manufactured of hardened steel such as air dry tool steel, although any steel may be hardened for use with the thatching fingers. Tool steel is a type of steel which is soft enough to stamp and machine in its original state. Once stamped and formed using a spring forming tool, the tool steel thatcher fingers 19 are hardened in an oven and allowed to cool at room temperature. This process produces an extremely hardened "spring action" metal component and provides the type of durable service one would expect from a quality tool. There are other metal hardening techniques, such as case hardening which involves heating the metal to a very high temperature and quenching the material in oil which may also of value.

If desired, the thatcher fingers 19 could also be welded into place on the bracket 17 using standard welding techniques. This of course would make it more difficult for future repairs to the fingers should one be damaged. Welding could also be used to attach the bracket 21 to the rototiller chassis.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A thatch removing attachment combined with a rototiller comprising in combination:

a rototiller machine having a plurality of separate ground engaging tiller blades fixed to a rotating shaft to break up the ground, said rototiller having a rear mounted elevated single first bracket located substantially at the center of the rototiller above said rototiller blades; and a generally horizontally and laterally disposed second bracket removably mountable to and rearwardly of said rototiller's first bracket to support said second bracket above the ground, said second bracket having a plurality of depending non-rotatable spaced coil spring tooth rake fingers along the second bracket's length, each of said rake fingers being generally curved in shape with tapered ground engaging end portions adapted to remove thatch from the ground.

* * * * *